(12) United States Patent
Marukawa et al.

(10) Patent No.: US 11,807,193 B2
(45) Date of Patent: Nov. 7, 2023

(54) VEHICLE MOUNTED MODULE SUPPORT SYSTEM

(71) Applicant: Honda Motor Co., Ltd., Tokyo (JP)

(72) Inventors: Taiga Marukawa, Rochester Hills, MI (US); Gilberto Larrache-Irizarry, Delaware, OH (US); Douglas M. Dafler, Delaware, OH (US); Patrick J. Ellison, Dublin, OH (US); Kosaku Tomozawa, Wako (JP); Keiichiro Tsuji, Novi, MI (US); Anthony John Leanza, Powell, OH (US); Takashi Nakano, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 55 days.

(21) Appl. No.: 17/696,430

(22) Filed: Mar. 16, 2022

(65) Prior Publication Data
US 2023/0294612 A1 Sep. 21, 2023

(51) Int. Cl.
*B60R 11/00* (2006.01)
*B60R 9/00* (2006.01)

(52) U.S. Cl.
CPC ............... *B60R 9/00* (2013.01); *B60R 11/00* (2013.01)

(58) Field of Classification Search
CPC ................................. B60R 9/00; B60R 11/00
USPC ........................................... 296/1.07, 203.01
See application file for complete search history.

(56) References Cited

U.S. PATENT DOCUMENTS

| | | | |
|---|---|---|---|
| 9,857,797 B2 | 1/2018 | Hara et al. | |
| 10,144,424 B2 | 12/2018 | Hara et al. | |
| 10,207,569 B2 * | 2/2019 | Moriyama | ............ B60J 5/0427 |
| 10,302,744 B1 | 5/2019 | Krishnan et al. | |
| 10,514,303 B2 | 12/2019 | Krishnan et al. | |
| 10,561,044 B2 | 2/2020 | Schmidt | |
| 10,597,089 B2 | 3/2020 | Ghannam et al. | |
| 10,737,737 B2 | 8/2020 | Birnschein et al. | |
| 10,761,534 B2 | 9/2020 | Carter et al. | |
| 10,773,273 B2 | 9/2020 | Ehteshami et al. | |
| 10,829,058 B2 | 11/2020 | Fan et al. | |
| 11,041,958 B2 | 6/2021 | Li et al. | |

(Continued)

FOREIGN PATENT DOCUMENTS

| | | |
|---|---|---|
| CN | 109421612 | 3/2019 |
| CN | 211032397 | 7/2020 |

(Continued)

*Primary Examiner* — Pinel E Romain
(74) *Attorney, Agent, or Firm* — RANKIN, HILL & CLARK LLP; Mark E. Duell

(57) ABSTRACT

A module support system for a vehicle including exterior paneling defining an interior and exterior of the vehicle, and a frame disposed in the interior of the vehicle, the module support system including a first casting mounted on the frame, where the first casting extends outward from the frame, through the exterior paneling, to the exterior of the vehicle such that the first casting includes an interior portion disposed within the interior of the vehicle and mounted on the frame, and an exterior portion extending outward from the exterior of the vehicle. The module support system includes a first electronic device supported on the exterior portion of the first casting, and a cover fixed with the exterior portion of the first casting such that the cover is disposed over the first electronic device and the exterior portion of the first casting with respect to an external environment.

20 Claims, 12 Drawing Sheets

(56) References Cited

U.S. PATENT DOCUMENTS

| | | |
|---|---|---|
| 2004/0121820 A1 | 6/2004 | Unno et al. |
| 2020/0215988 A1 | 7/2020 | Jackson et al. |
| 2020/0346590 A1 | 11/2020 | Shane et al. |
| 2020/0406834 A1 | 12/2020 | Russell et al. |
| 2021/0024081 A1 | 1/2021 | Johnson-Roberson et al. |
| 2021/0025983 A1 | 1/2021 | Patil et al. |
| 2021/0096248 A1 | 4/2021 | Zhu |
| 2021/0124055 A1 | 4/2021 | Smith et al. |

FOREIGN PATENT DOCUMENTS

| | | |
|---|---|---|
| DE | 102018128648 | 5/2020 |
| EP | 3845427 | 7/2021 |
| WO | 2018187089 | 10/2018 |
| WO | 2020180707 | 9/2020 |

* cited by examiner

VEHICLE MOUNTED MODULE SUPPORT SYSTEM

BACKGROUND

Vehicles configured for acquiring data describing an external environment can include sensors extended outward from the vehicle. Sensors extended outward from the vehicle require sensor support systems with sufficient strength for supporting the sensors away from the vehicle with respect to the vehicle, and sufficient rigidity for holding the sensors at a constant position with the vehicle during operation of the vehicle. These requirements in strength and rigidity in sensor support systems forces a compromise in vehicle sensor designs between a total weight of sensors, the distance the sensors are supported outward from the vehicle, and the size of the sensor support system. As such, there is demand for sensor support systems capable of carrying more weight a distance outward from a vehicle without being excessively large.

BRIEF DESCRIPTION

According to one aspect, a module support system for a vehicle including exterior paneling defining an interior and exterior of the vehicle, and a frame disposed in the interior of the vehicle, the module support system including a first casting, a first electronic device, and a cover. The first casting is mounted on the frame, where the first casting extends outward from the frame, through the exterior paneling, to the exterior of the vehicle such that the first casting includes an interior portion disposed within the interior of the vehicle and mounted on the frame, and an exterior portion extending outward from the exterior of the vehicle. The first electronic device is supported on the exterior portion of the first casting. The cover is fixed with the exterior portion of the first casting such that the cover is disposed over the first electronic device and the exterior portion of the first casting with respect to an external environment of the vehicle.

According to another aspect, a method of assembling a module support system for a vehicle including exterior paneling defining an interior and exterior of the vehicle, and a frame disposed in the interior of the vehicle, the method includes mounting a first casting on the frame, where the first casting extends outward from the frame, through the exterior paneling, to the exterior of the vehicle such that the first casting includes an interior portion disposed within the interior of the vehicle and mounted on the frame, and an exterior portion extending outward from the exterior of the vehicle. The method also includes providing an electronic device supported on the exterior portion of the first casting. The method also includes fixing a cover with the exterior portion of the first casting such that the cover is disposed over the exterior portion and the first electronic device with respect to an external environment of the vehicle.

DETAILED DESCRIPTION

Figure 1:
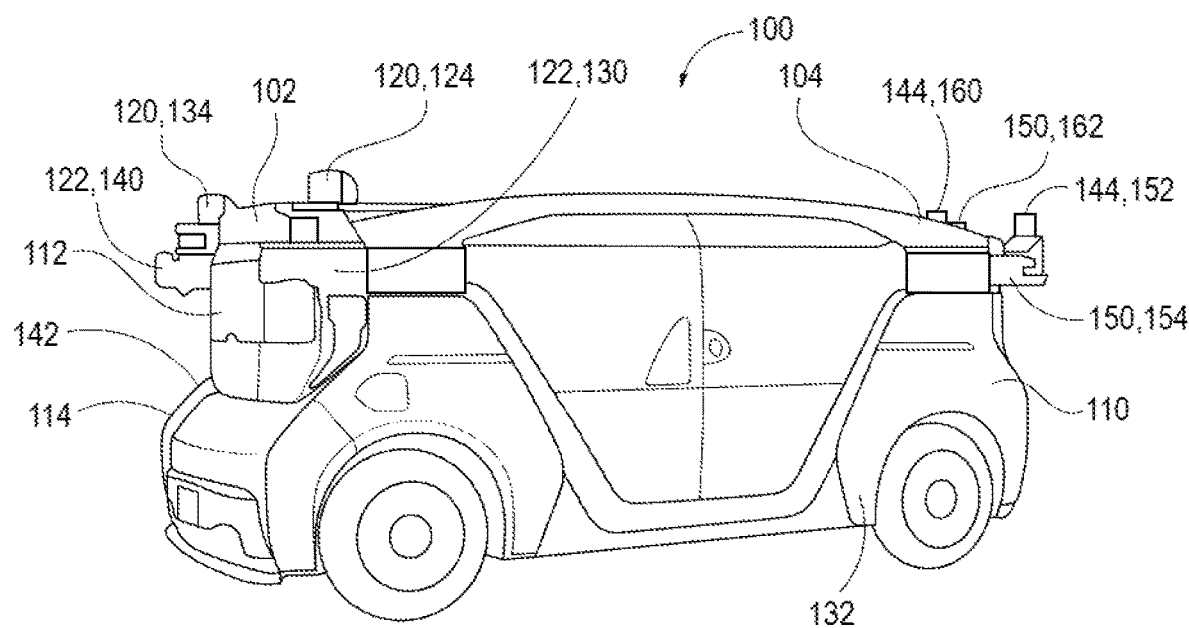
FIG. 1 is a perspective view of an autonomous vehicle including modular support systems according to the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts an autonomous vehicle 100 including a first longitudinal end portion 102 and second longitudinal end portion 104 extended from the first longitudinal end portion 102 in a longitudinal direction of the vehicle 100. The vehicle 100 includes exterior paneling 110 covering the first longitudinal end portion 102 and the second longitudinal end defining an interior 112 and an exterior 114 of the vehicle 100.

A first pair of sensor modules 120 are respectively supported on the first longitudinal end portion 102 by a first pair of module support systems 122. The first pair of module support systems 122 extend outward from the exterior 114 in the longitudinal direction of the vehicle 100 and a lateral direction of the vehicle 100 perpendicular to the longitudinal direction, and support the first pair of sensor modules 120 spaced from the exterior 114.

The first pair of sensor modules 120 and the first pair of module support systems 122 are arranged on opposite sides of the vehicle 100 in the lateral direction of the vehicle 100. With this construction, a first sensor module 124 in the first pair of sensor modules 120 and a first module support system 130 in the first pair of module support systems 122 are positioned on a first lateral side 132 of the vehicle 100. A second sensor module 134 in the first pair of sensor modules 120 and a second module support system 140 in the first pair of module support systems 122 are positioned on a second lateral side 142 of the vehicle 100. The first lateral side 132 of the vehicle 100 and the second lateral side 142 of the vehicle 100 include similar features, and function in a similar manner as each other with orientations mirrored from each other in the lateral direction of the vehicle 100.

The first sensor module 124 and the second sensor module 134 in the first pair of sensor modules 120 include similar features, and function in a similar manner as each other with orientations mirrored from each other in the lateral direction of the vehicle 100. The first module support system 130 and the second module support system 140 in the first pair of module support systems 122 include similar features, and function in a similar manner as each other with orientations mirrored from each other in the lateral direction of the vehicle 100.

A second pair of sensor modules 144 are respectively supported on the second longitudinal end portion 104 by a second pair of module support systems 150. The second pair of module support systems 150 extend outward from the exterior 114 in the longitudinal direction of the vehicle 100 and the lateral direction of the vehicle 100, with the second pair of sensor modules 144 spaced away from the exterior 114. The second pair of sensor modules 144 and the second pair of module support systems 150 are arranged on opposite sides of the vehicle 100 in the lateral direction of the vehicle 100.

With this construction, a first sensor module 152 in the second pair of sensor modules 144 and a first module support system 154 in the second pair of module support systems 150 are positioned on the first lateral side 132 of the vehicle 100. A second sensor module 160 in the second pair of sensor modules 144 and a second module support system 162 in the second pair of module support systems 150 are positioned on the second lateral side 142 of the vehicle 100.

The first sensor module 152 and the second sensor module 160 in the second pair of sensor modules 144 include similar features, and function in a similar manner as each other with orientations mirrored from each other in the lateral direction of the vehicle 100. The first module support system 154 and the second module support system 162 in the second pair of module support systems 150 include similar features, and function in a similar manner as each other with orientations mirrored from each other in the lateral direction of the vehicle 100.

Each of the first pair of sensor modules 120 and the second pair of sensor modules 144 is configured for collecting information representing an external environment of the vehicle 100, and directing the information to a vehicle electronic control system or computer (not shown) provided in the interior 112 of the vehicle 100. While, as depicted, each of the first pair of sensor modules 120 and the second pair of sensor modules 144 includes a lidar sensor system, each of the first pair of sensor modules 120 and the second pair of sensor modules 144 may additionally or alternatively include a variety of radar, optical camera, and other types of sensors configured for collecting information representing the external environment of the vehicle 100 without departing from the scope of the present disclosure.

Figure 2:
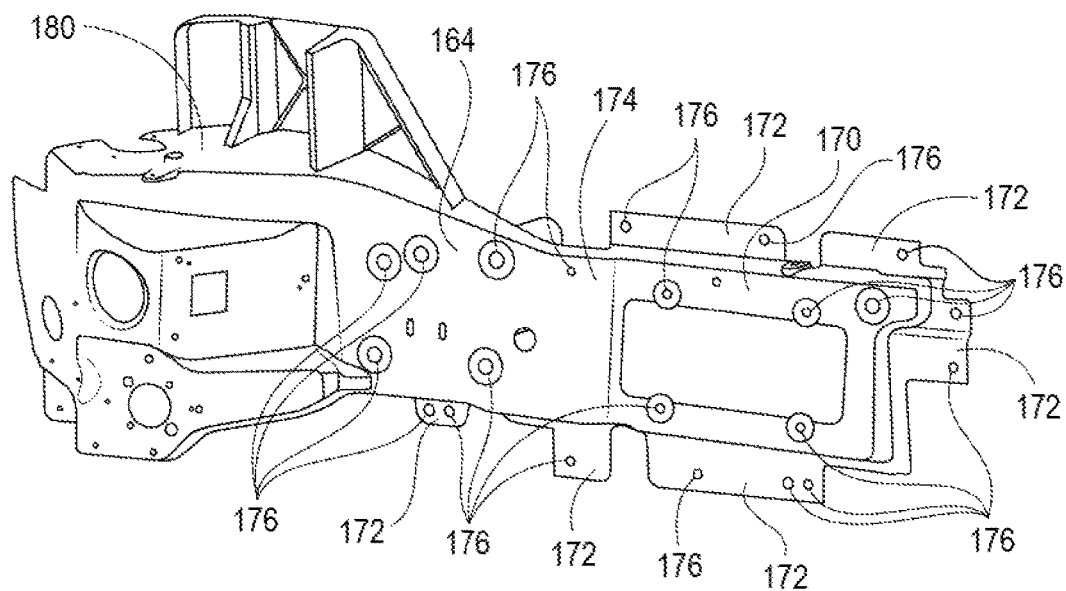
FIG. 2 is a perspective view of a first casting configured for being provided in a first pair of module support systems mounted on the vehicle.

FIG. 2 depicts a first casting 164 included in the first module support system 130 in the first pair of module support systems 122 shown in FIG. 1. As shown in FIG. 2, the first casting 164 includes an interior portion 170 configured for being mounted to the vehicle 100 in the vehicle interior 112. The interior portion 170 of the first casting 164 includes a plurality of first casting flanges 172 extended from a first casting main body portion 174. The interior portion 170 is configured for being fixed with the vehicle 100 at a plurality of first casting holes 176 defined in the plurality of first casting flanges 172 and the first casting main body portion 174, where the plurality of first casting holes 176 are configured for receiving fasteners driven into the vehicle 100.

The first casting 164 also includes an exterior portion 180 extended from the interior portion 170. The first casting 164 is a single unitary piece, the interior portion 170 being integrally formed with the exterior portion 180. The first casting 164 is configured for supporting the first sensor module 124 in the first pair of sensor modules 120 on the exterior portion 180 and the interior portion 170 with respect to the vehicle 100 through the interior portion 170 mounted on the vehicle 100 at the plurality of first casting holes 176.

Figure 3:
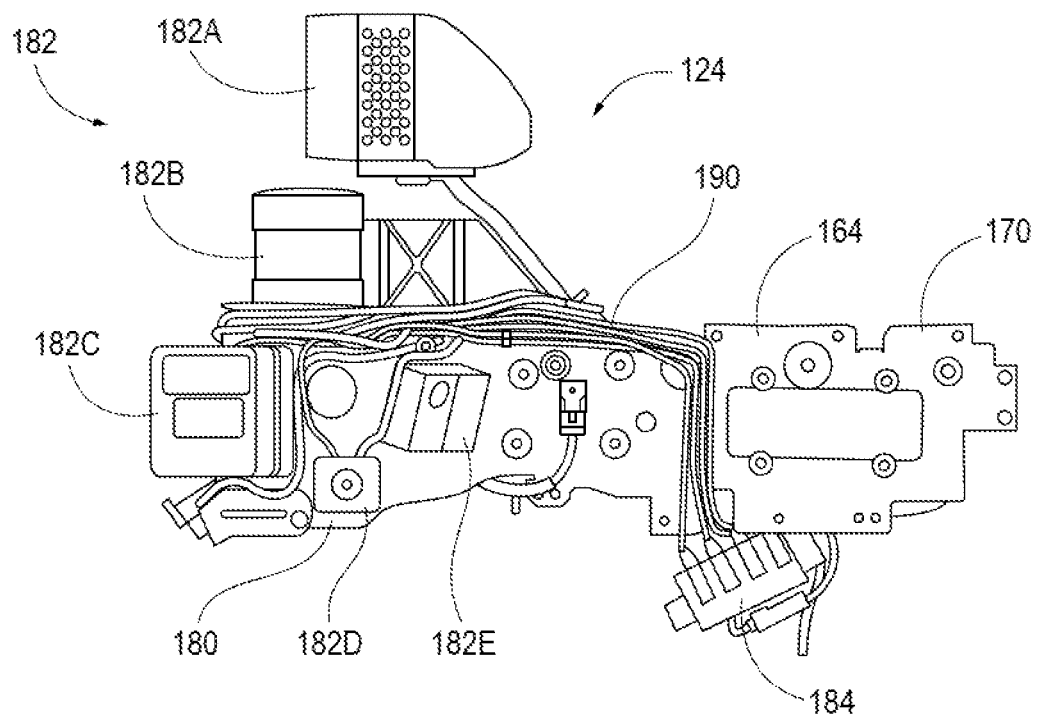
FIG. 3 is a front view of the first casting of FIG. 2, assembled with a first sensor module in a first pair of sensor modules supported on the vehicle.

As shown in FIG. 3, the first sensor module 124 in the first pair of sensor modules 120 is disposed on the first casting 164, with first electronic devices 182A-182E, collectively referred to herein as the first electronic device 182 arranged on the exterior portion 180 and a second electronic device 184 arranged on the interior portion 170. The first electronic device 182 and the second electronic device 184 are wired to a circuit 190 that extends along the first casting 164, from the interior portion 170 to the exterior portion 180.

The first electronic device 182 includes a sensor configured for collecting information representing the external environment of the vehicle 100, including spatial information representing the external environment of the vehicle 100. The second electronic device 184 includes circuitry configured to functionally support the first electronic device 182 and connect the first electronic device to the computer and an electrical system (not shown) provided in the interior 112 of the vehicle 100.

The first electronic device 182 and the second electronic device 184 are configured for directing the information collected by the first electronic device 182, via the circuit 190, to the computer provided in the interior 112 of the vehicle 100. While the first electronic device 182 and the second electronic device 184 are configured for collecting and directing information, including spatial information describing an external environment of the vehicle 100, to the computer provided in the interior 112 of the vehicle 100 via the circuit 190, the first electronic device 182 and the second electronic device 184 may additionally or alternatively collect information describing other aspects of an external environment of the vehicle 100, additionally or alternatively transmit information to the computer in the interior 112 of the vehicle 100 or another computer exterior to the vehicle 100, and additionally or alternatively transmit information wirelessly without departing from the scope of the present disclosure. The first electronic device 182 and the second electronic device 184 are also configured for receiving power, via the circuit 190, from the electrical system provided in the interior 112 of the vehicle 100.

Figure 4:
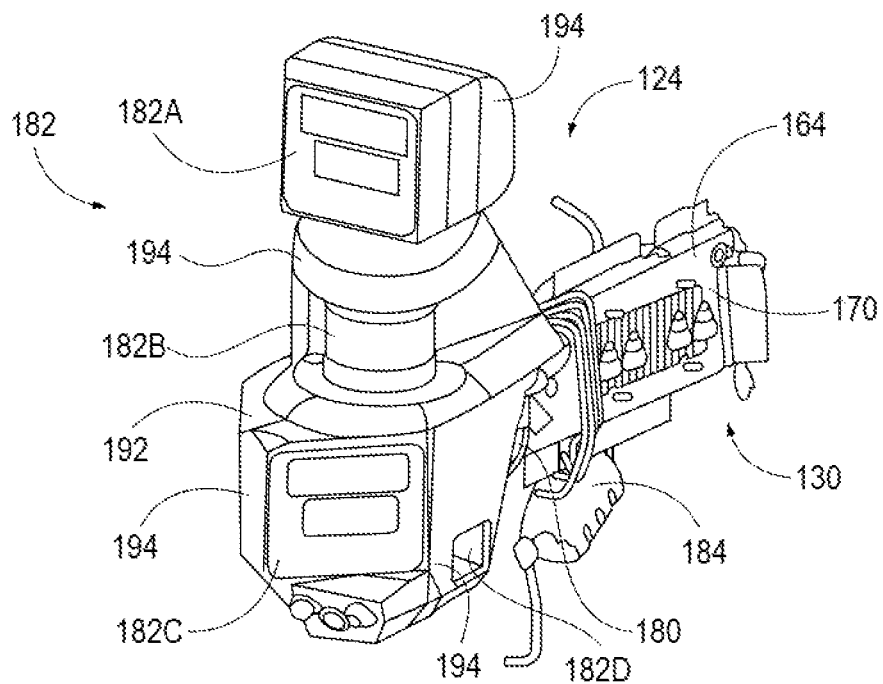
FIG. 4 is a perspective view of the first casting and the first sensor module of FIG. 3, assembled with a cover.

As shown in FIG. 4, the first module support system 130 in the first pair of module support systems 122 includes a cover 192 fixed with the exterior portion 180 of the first casting 164 such that the cover 192 is disposed over the first electronic device 182 and the exterior portion 180 of the first casting 164 with respect to the external environment of the vehicle 100. In this manner, the cover 192 at least partially shields the first electronic device 182 and the exterior portion 180 of the first casting 164 from an exterior environment of the vehicle 100. A portion of the first electronic device 182 is mounted on the cover 192 such that the cover 192 supports the first electronic device 182 on the exterior portion 180 of the first casting 164.

The cover 192 is formed from a plurality of cover panels 194 fixed with each other and the exterior portion 180 of the first casting 164. While, as depicted, the cover 192 includes four cover panels 194, the cover 192 may include more or fewer panels disposed over the first electronic device 182 and the exterior portion 180 of the first casting 164 without departing from the scope of the present disclosure.

Figure 5:
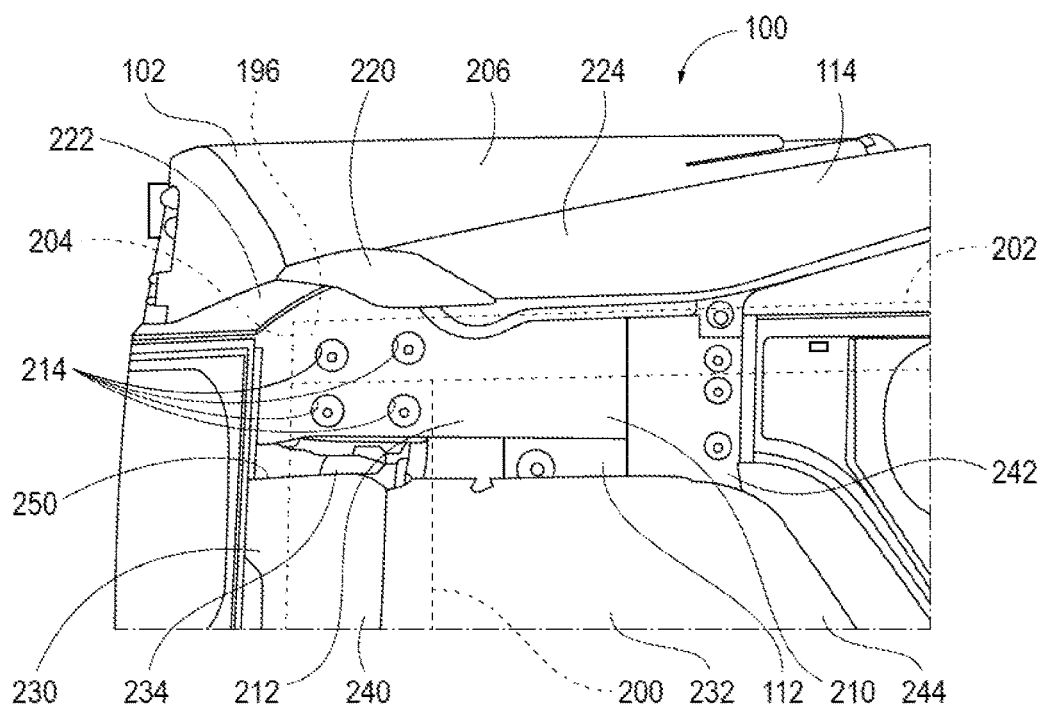
FIG. 5 is a partial side view of the vehicle including a first longitudinal end of the vehicle.

As shown in FIG. 5, the vehicle 100 includes a frame 196 that is a supporting structure of the vehicle 100 disposed in the interior 112 of the vehicle 100. The frame 196 includes a first support beam 200, drawn schematically in hidden lines, extending in a height direction of the vehicle 100 that is perpendicular to the longitudinal direction and the lateral direction of the vehicle 100. The frame 196 also includes a second support beam 202, drawn schematically in hidden lines, extending in the longitudinal direction of the vehicle 100.

The first support beam 200 and the second support beam 202 are connected to each other so as to form a first corner 204 of the frame 196 at a roof 206 of the vehicle 100 in the first longitudinal end portion 102. A junction 210 is mounted on and extends between the first support beam 200 and the second support beam 202. The junction 210 is a casting shaped with a plate portion 212 fixed with each of the first support beam 200 and the second support beam 202, the plate portion 212 extending along the second support beam 202 in the longitudinal direction of the vehicle 100.

The plate portion 212 of the junction 210 defines a plurality of junction holes 214 which are aligned with the first support beam 200 and the second support beam 202 in the lateral direction of the vehicle 100. The plurality of junction holes 214 are aligned with first casting holes 176 in the plurality of first casting holes 176, and configured for receiving fasteners driven into the first support beam 200 and the second support beam 202 for fixing the junction 210 to the first support beam 200 and the second support beam 202 in the interior 112 of the vehicle 100.

The junction 210 includes a distal end portion 220 that extends from the plate portion 212 to the exterior 114 of the vehicle 100, forming a portion of the roof 206 at the first corner 204 formed between the first support beam 200 and the second support beam 202. The distal end portion 220 of the junction 210 is interlocked with a first exterior panel 222 and a second exterior panel 224 included in the exterior paneling 110 at the roof 206.

A third exterior panel 230 and a fourth exterior panel 232 included in the exterior paneling 110 have main body portions defining the exterior 114 of the vehicle 100, and flanges that extend into the interior 112 of the vehicle 100, over the first support beam 200 and the second support beam 202 in the lateral direction of the vehicle 100. The third exterior panel 230 includes a third exterior panel flange 234 extended from a third exterior panel main body portion 240 and into the interior 112 of the vehicle 100. Each of the third exterior panel flange 234 and the third exterior panel main body portion 240 overlap the first support beam 200 in the lateral direction of the vehicle 100, and extend along the first support beam 200 in the height direction of the vehicle 100.

The fourth exterior panel 232 includes a fourth exterior panel flange 242 extended from a fourth exterior panel main body portion 244 and into the interior 112 of the vehicle 100. The fourth exterior panel flange 242 overlaps the second support beam in the lateral direction of the vehicle 100, and extends across the second support beam 202 in the height direction of the vehicle 100, along the junction 210. The fourth exterior panel main body portion 244 extends downward from the second support beam 202 in the height direction of the vehicle 100, and extends in the longitudinal direction from the first support beam 200, at the first corner 204 formed between the first support beam 200 and the second support beam 202.

The first exterior panel 222, the second exterior panel 224, the third exterior panel 230, and the fourth exterior panel 232 are castings interlocked with each other, fixed with the frame 196 in the interior 112 of the vehicle 100, and form the exterior 114 of the vehicle 100. The first exterior panel 222, the second exterior panel 224, the third exterior panel 230, and the fourth exterior panel 232 extend into the interior 112 of the vehicle 100 so as to define a recess 250 extended from the exterior 114 to the interior 112, and configured for receiving the interior portion 170 of the first casting 164 in the first pair of module support systems 122.

Figure 6:
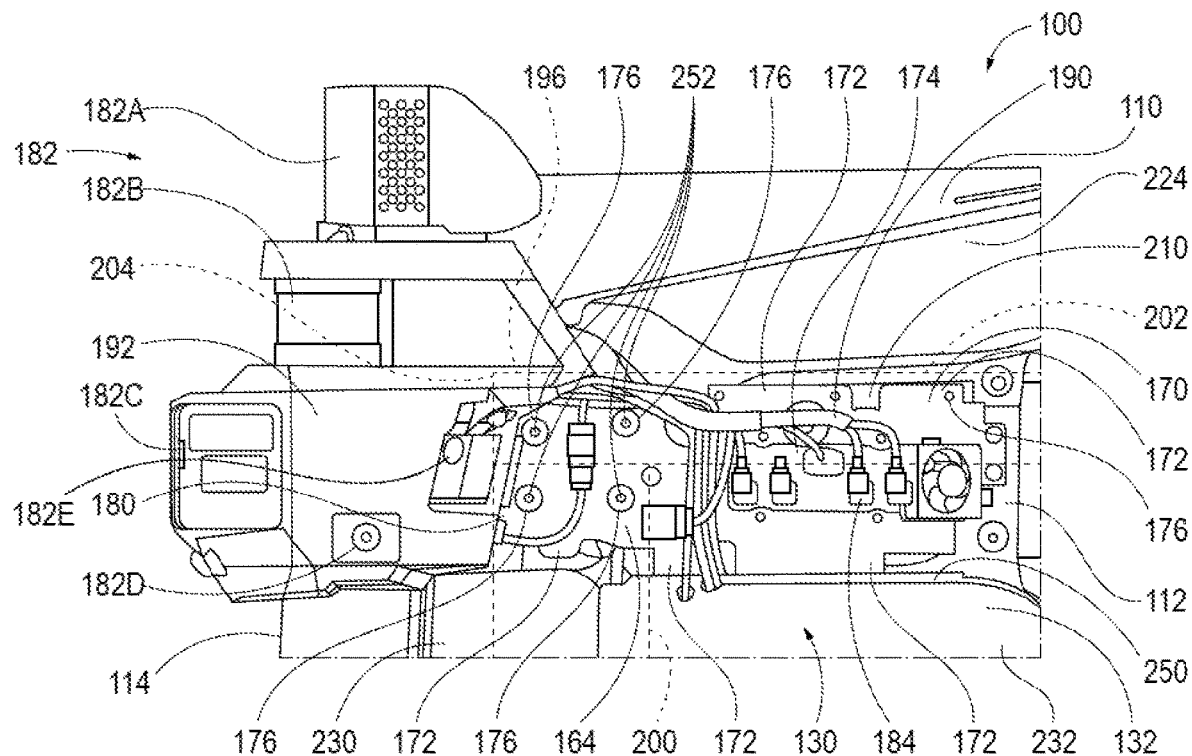
FIG. 6 is a partial side view of the vehicle with the first casting and the first sensor module of FIG. 3 mounted thereon.

As shown in FIG. 6, the first casting 164 is mounted on the frame 196 through the junction 210, the second exterior panel 224, the third exterior panel 230, and the fourth exterior panel 232. The plurality of first casting flanges 172 and the first casting main body portion 174 overlap the second exterior panel 224, the third exterior panel 230, and the fourth exterior panel 232 in the lateral direction of the vehicle 100.

Fasteners 252 are disposed in the plurality of first casting holes 176, through the junction 210, the second exterior panel 224, the third exterior panel 230, and the fourth exterior panel 232. The fasteners 252 extend into the frame 196, fixing the first casting 164, the first electronic device 182, and the second electronic device 184 to the frame 196 through the junction 210, the second exterior panel 224, the third exterior panel 230, and the fourth exterior panel 232.

The interior portion 170 of the first casting 164 is mounted on the first support beam 200 and the second support beam 202 in the recess 250, in the interior 112 of the vehicle 100. The exterior portion 180 extends away from the interior portion 170, outward from the frame 196 in the interior 112 of the vehicle 100, and beyond the exterior 114 of the vehicle 100. With this construction, the interior portion 170 is disposed in the recess 250, within the interior 112 of the vehicle 100 between the frame 196 and the exterior paneling 110, and the exterior portion 180 extends outward from the exterior 114 of the vehicle 100.

The first electronic device 182 is supported on the exterior portion 180 of the first casting 164 above the frame 196 in a height direction of the vehicle 100 where the interior portion 170 of the first casting 164 is mounted to the frame 196. The first electronic device 182 is also supported on the exterior portion 180 of the first casting 164 spaced away from the frame 196 in the longitudinal direction and the lateral direction of the vehicle 100 where the interior portion 170 of the first casting 164 is mounted to the frame 196. With this construction, the first electronic device 182 is arranged to collect information representing an external environment of the vehicle 100 above and around the frame 196 at the first corner 204 on the first lateral side 132 of the vehicle 100.

The first electronic device 182 is wired to the circuit 190, and the circuit 190 extends along the first casting 164 to the interior portion 170 of the first casting 164, into the interior 112 of the vehicle 100. The circuit 190 connects the first electronic device 182 and the second electronic device 184 to a data system (not shown) and the electrical system provided in the vehicle 100 for receiving power and communicating with the computer provided in the vehicle 100.

The cover 192 is fixed with the exterior portion 180 of the first casting 164 such that the cover 192 is disposed over the first electronic device 182 and the exterior portion 180 of the first casting 164 with respect to an external environment of the vehicle 100. In this manner, the cover 192 is configured to obstruct water, snow, and debris from reaching the exterior portion 180 and the first electronic device 182 from an external environment of the vehicle 100.

Figure 7:
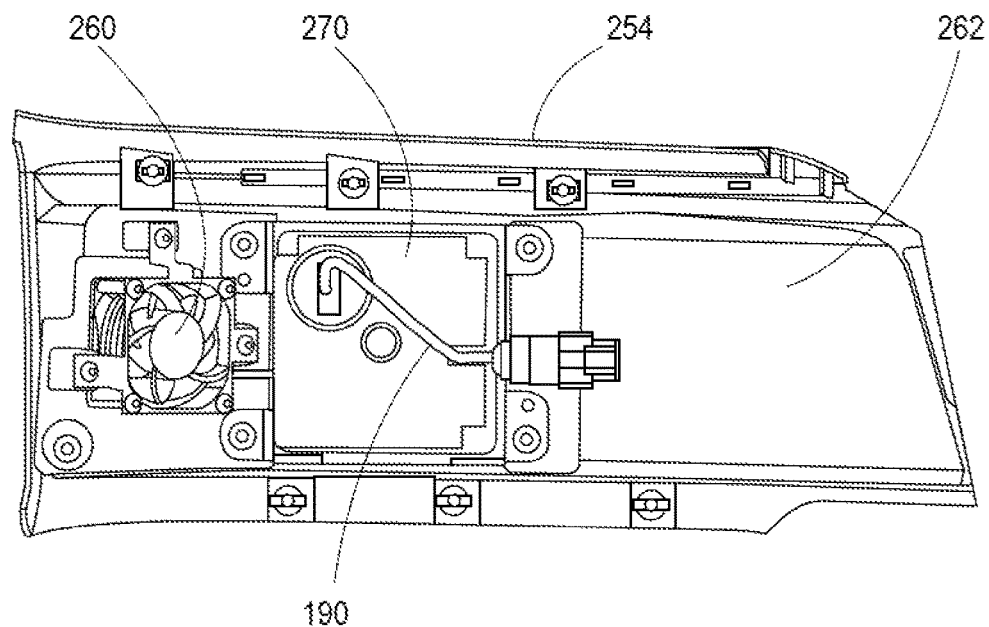
FIG. 7 is a front view of an exterior panel configured for being mounted on the vehicle, over the first casting and the first sensor module of FIG. 3.

As shown in FIG. 7, a fifth exterior panel 254 is shaped for being received in the recess 250, in the interior 112 of the vehicle 100 at the first longitudinal end 102, over the interior portion 170 of the first casting 164. A fan 260 is mounted on the fifth exterior panel 254 and configured to draw ambient air through the fifth exterior panel 254 from an interior side 262 of the fifth exterior panel 254 to an exterior side 264 of the fifth exterior panel 254 depicted in FIG. 8.

With continued reference to FIG. 7, a third electronic device 270 is mounted on the interior side 262 of the fifth exterior panel 254. The third electronic device 270 includes a sensor configured for collecting information representing an external environment of the vehicle 100, and wired to the circuit 190 for receiving power and transmitting information. The third electronic device 270 includes similar features and functions in a similar manner as the first electronic device 182 and the second electronic device 184 with respect to collecting information representing an external environment of the vehicle 100, and receiving power and transmitting information via the circuit 190.

Figure 8:
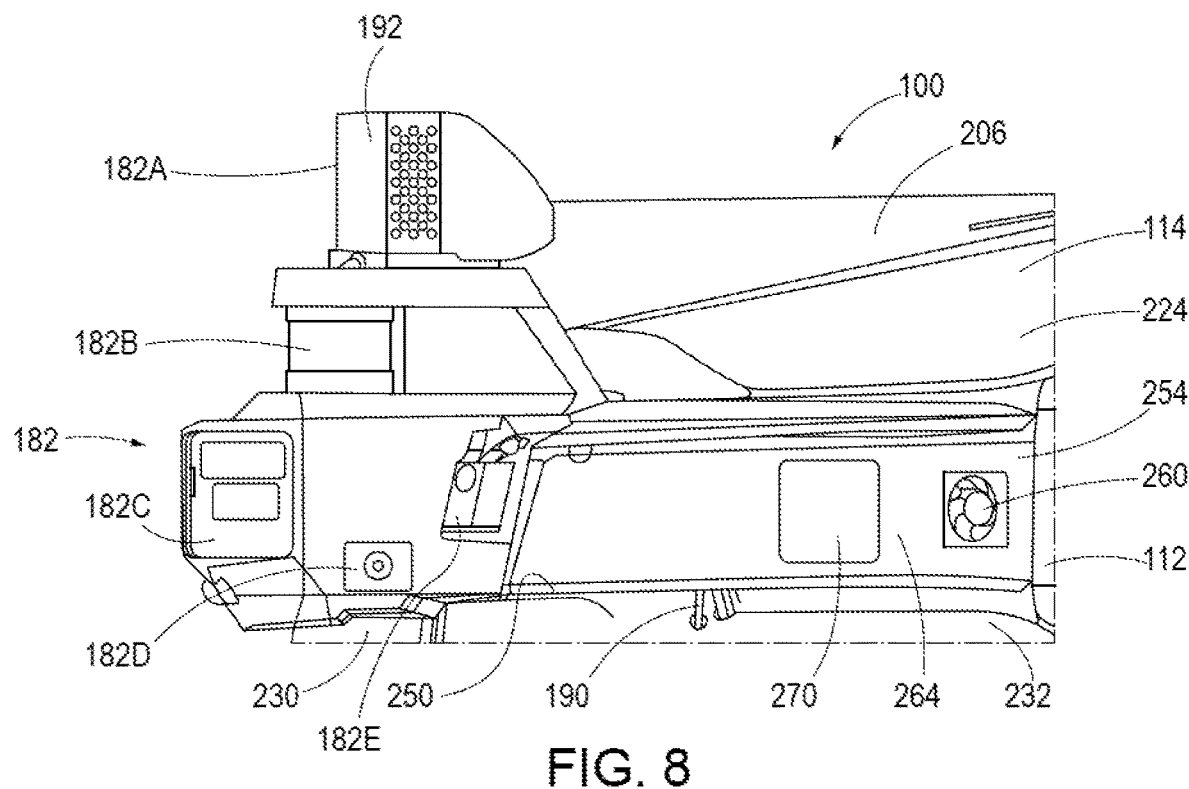
FIG. 8 is a partial side view of the vehicle with the first casting and the first sensor module of FIG. 3, and the exterior panel of FIG. 7 mounted thereon.

As shown in FIG. 8, the fifth exterior panel 254 is mounted in the recess 250, on the interior 112 of the vehicle 100 such that the exterior side 264 forms the exterior 114 of the vehicle 100 between the first exterior panel 222 (FIG. 5) and the third exterior panel 230, and between the second exterior panel 224 and the fourth exterior panel 232 in the height direction of the vehicle 100. The fifth exterior panel 254 covers the interior portion 170, the second electronic device 184, the third electronic device 270, and the circuit 190 from an external environment of the vehicle 100.

The fan 260 is positioned in the interior 112 of the vehicle 100 such that the fan 260 is configured for directing ambient air from an external environment of the vehicle 100 to the interior 112 of the vehicle 100, into the recess 250 toward the second electronic device 184 and the third electronic device 270. In this manner, the fan 260 is configured for cooling the second electronic device 184 and the third electronic device 270 with ambient air from an external environment of the vehicle 100.

Figure 9:
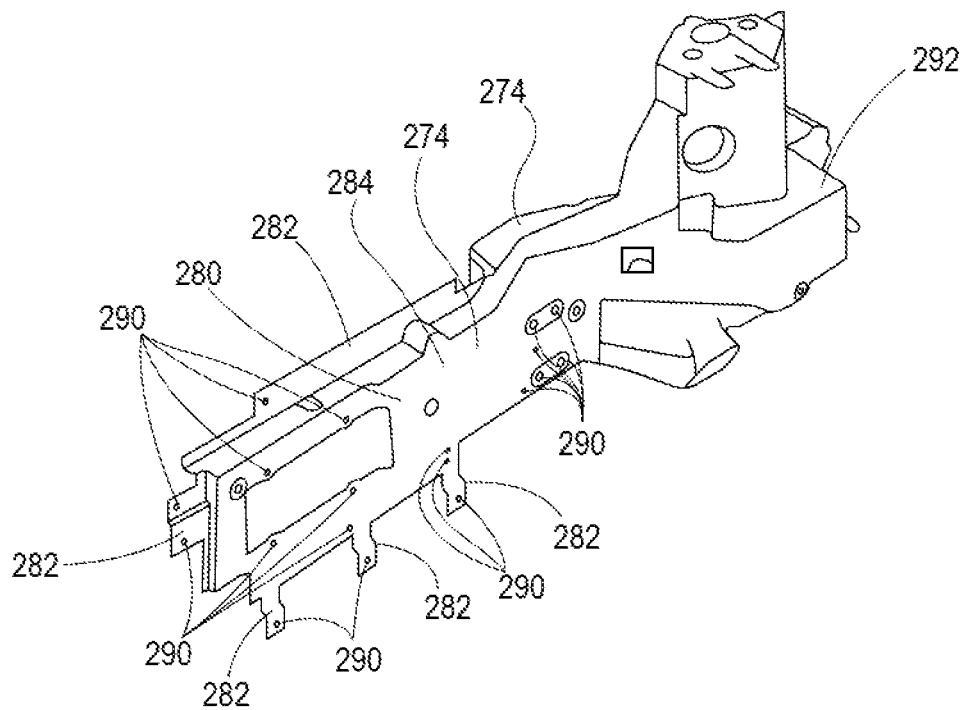
FIG. 9 is a perspective view of a first casting and a second casting configured for being provided in a second pair of module support systems mounted on the vehicle.

FIG. 9 depicts a first casting 272 and a second casting 274 included in the first module support system 154 in the second pair of module support systems 150 shown in FIG. 1. As shown in FIG. 9, the first casting 272 includes an interior portion 280 configured for being mounted to the vehicle 100 in the interior 112 of the vehicle 100. The interior portion 280 of the first casting 272 includes a plurality of first casting flanges 282 extended from a first casting main body portion 284. The interior portion 280 is configured for being fixed with the vehicle 100 at a plurality of first casting holes 290 defined in the plurality of first casting flanges 282 and the first casting main body portion 284, where the plurality of first casting holes 290 are configured for receiving fasteners driven into the vehicle 100.

The first casting 272 also includes an exterior portion 292 extended from the interior portion 280. The first casting 272 is a single unitary piece, the interior portion 280 being integrally formed with the exterior portion 292. The second casting 274 is fastened to the first casting 272 at the exterior portion 292 such that the first casting 272 and the second casting 274 are configured for being mounted on the vehicle 100. The first casting 272 and the second casting 274 are configured for supporting the first sensor module 152 in the second pair of sensor modules 144 on the exterior portion 292 and the interior portion 280 with respect to the vehicle 100.

Figure 10:
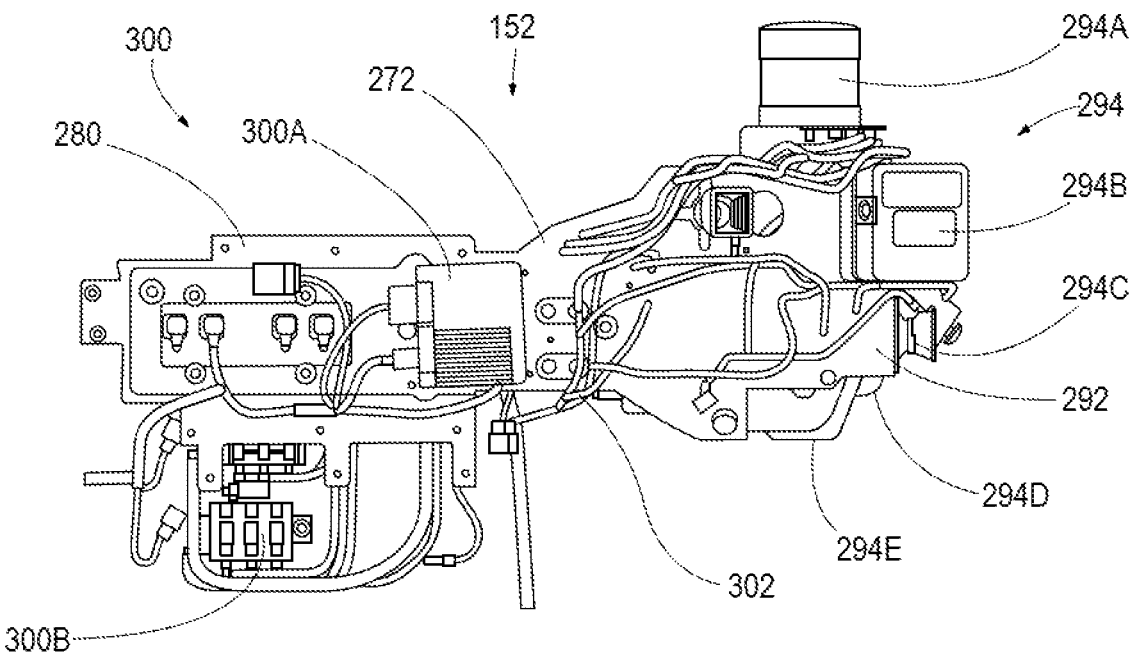
FIG. 10 is a front view the first casting and the second casting of FIG. 9 assembled with a first sensor module in a second pair of sensor modules supported on the vehicle.

As shown in FIG. 10, the first sensor module 152 in the second pair of sensor modules 144 is disposed on the first casting 272, with first electronic devices 294A-294E, collectively referred to herein as the first electronic device 184, arranged on the exterior portion 292, and second electronic devices 300A, 300B collectively referred to herein as the second electronic device 300, arranged on the interior portion 280. The first electronic device 294 and the second electronic device 300 are wired to a circuit 302 that extends along the first casting 272, from the interior portion 280 to the exterior portion 292. The first electronic device 294, the second electronic device 300, and the circuit 302 in the first sensor module 152 in the second pair of sensor modules 144 respectively include similar features and function in a similar manner as the first electronic device 182, the second electronic device 184, and the circuit 190 in the first sensor module 124 in the first pair of sensor modules 120.

Figure 11:
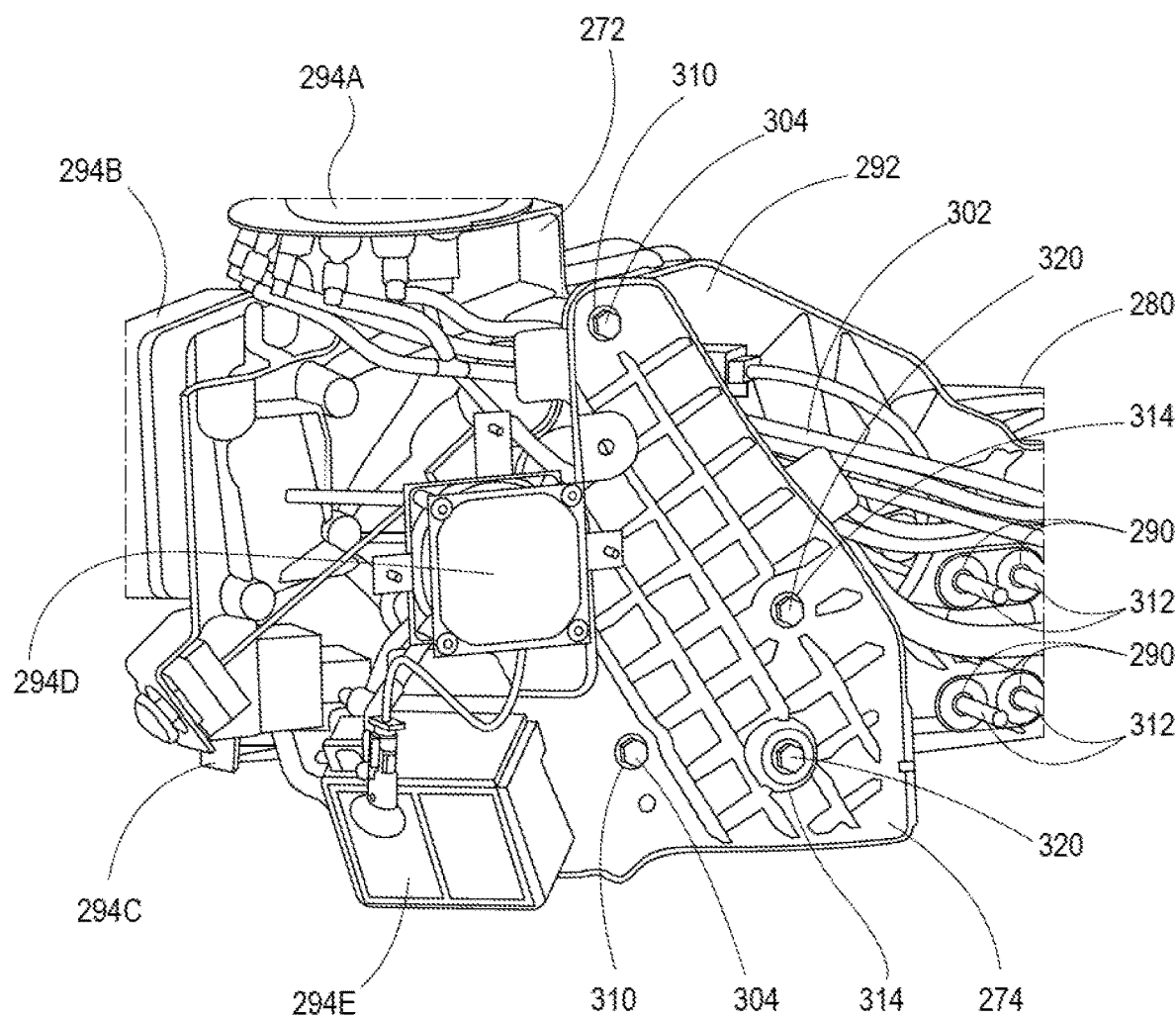
FIG. 11 is a partial perspective view of the first casting and the second casting of FIG. 9.

As shown in FIG. 11, the second casting 274 is fastened to the first casting 272 via a first plurality of second casting fasteners 304 disposed through a first plurality of second casting holes 310. The first casting 272 is configured for receiving the first plurality of second casting fasteners 304, fixing the second casting 274 with the first casting 272.

The first casting 272 and the second casting 274 are each configured for being directly mounted onto the vehicle 100. As depicted, a plurality of first casting fasteners 312 is disposed through the plurality of first casting holes 290. The vehicle 100 is configured for receiving the plurality of first casting fasteners 312 through the plurality of first casting holes 290, fixing the first casting 272 with the vehicle 100.

The second casting 274 defines a second plurality of second casting holes 314, with a second plurality of second casting fasteners 320 disposed through the second plurality of second casting holes 314. The vehicle 100 is configured for receiving the second plurality of second casting fasteners 320 through the second plurality of second casting holes 314, fixing the second casting 274 with the vehicle 100.

While, as depicted, the first casting fasteners 312, the first plurality of second casting fasteners 304, and the second plurality of second casting fasteners 314 are bolts, each of the first casting fasteners 312, the first plurality of second casting fasteners 304, and the second plurality of second casting fasteners 314 may additionally or alternatively include other fastener types configured for fixing the first casting 272 and the second casting 274 with each other and the vehicle 100 without departing from the scope of the present disclosure.

Figure 12:
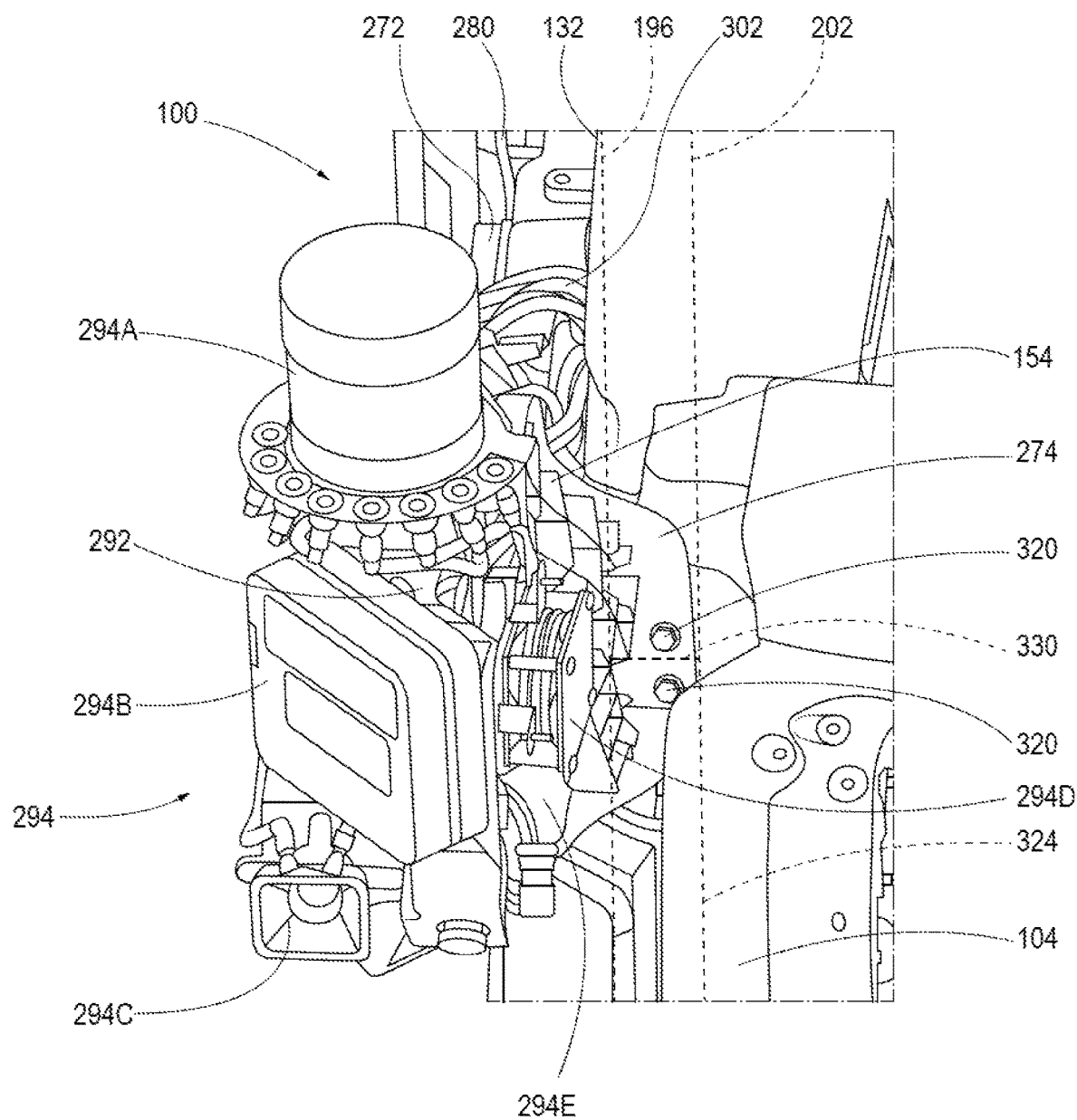
FIG. 12 is a partial perspective view of the vehicle with the first casting and the second casting of FIG. 9 mounted thereon.

As shown in FIG. 12, the first casting 272 and the second casting 274 are respectively mounted on the frame 196 of the vehicle 100 via the first casting fasteners 312 (FIG. 11) and the second plurality of second casting fasteners 320. The first casting 272 and the second casting 274 are fastened with each other and mounted on the frame 196 such that the second casting 274 supports the first casting 272 and the first electronic device 294 with respect to the frame 196.

The first casting 272 is arranged along the first lateral side 132 of the vehicle 100 and extends in the longitudinal direction of the vehicle 100 along the second support beam 202. The exterior portion 292 of the first casting 272 extends beyond the frame 196 in the longitudinal direction of the vehicle 100. The second casting 274 extends from the exterior portion 292 of the first casting in the lateral direction of the vehicle 100, overlapping the frame 196 in the longitudinal direction of the vehicle 100. In this manner, the first casting 272 and the second casting 274 extend around the second longitudinal end portion 104 of the vehicle 100 from the first lateral side 132 of the vehicle 100, and support the first electronic device 294 from positions on the frame 196 located along the second support beam 202 in the longitudinal direction of the vehicle 100, and along the second longitudinal end portion 104 in the lateral direction of the vehicle 100.

The first casting fasteners 312 are disposed through the first casting 272 and into the frame 196 in the lateral direction of the vehicle 100, and the second plurality of second casting fasteners 320 are disposed through the second casting 274 and into the frame 196 in the longitudinal direction of the vehicle 100. With this construction, the first casting 272 is fastened to the frame 196 in the lateral direction of the vehicle 100, and the second casting 274 is fastened to the frame 196 in the longitudinal direction of the vehicle 100.

Figure 13:
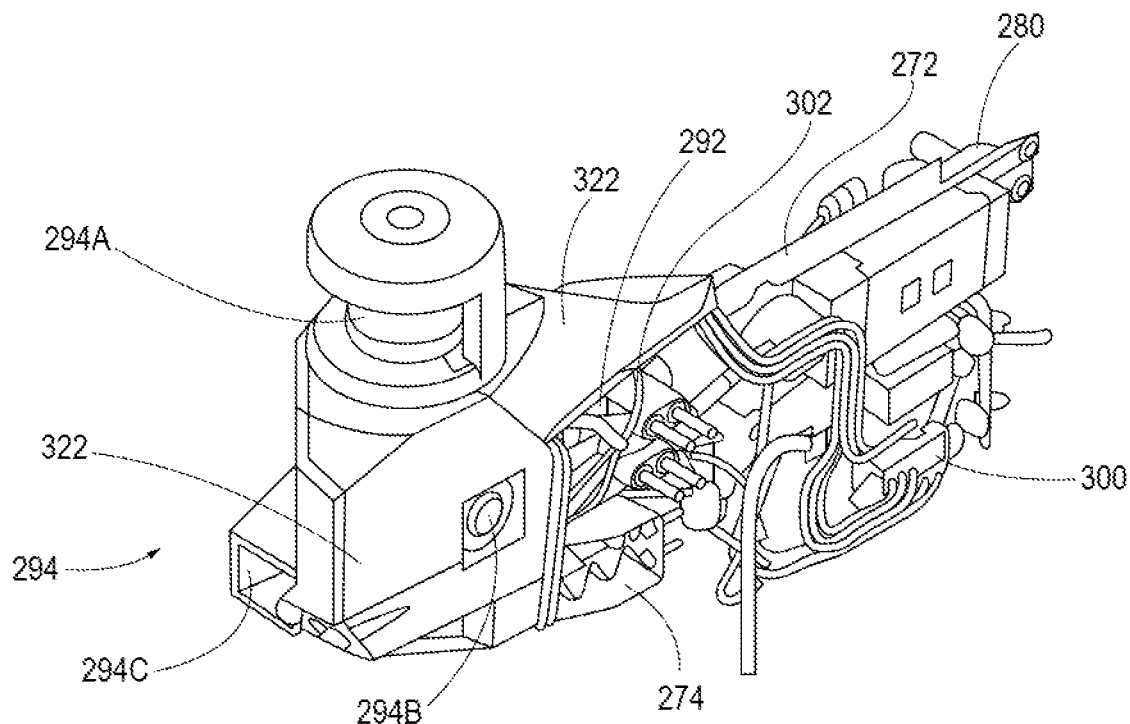
FIG. 13 is a perspective view of the first casting, the second casting, and the first sensor module of FIG. 10, assembled with a cover.

As shown in FIG. 13, the first module support system 154 in the second pair of module support systems 150 includes a cover 322 fixed with the exterior portion 292 of the first casting 272 such that the cover 322 is at least partially disposed over the first electronic device 294 and the exterior portion 292 of the first casting 272 with respect to the external environment of the vehicle 100. A portion of the first electronic device 294 is mounted on the cover 322 such that the cover 322 supports the first electronic device 294 on the exterior portion 292 of the first casting 272.

The cover 322 of the first module support system 154 in the second pair of module support systems 150 includes similar features and functions in a similar as the cover 192 of the first module support system 130 in the first pair of module support systems 122 with respect to shielding the first electronic device 294 and the exterior portion 292 of the first casting 272 from an exterior environment of the vehicle 100 and supporting the first electronic device 294 on the first casting 272.

Figure 14:
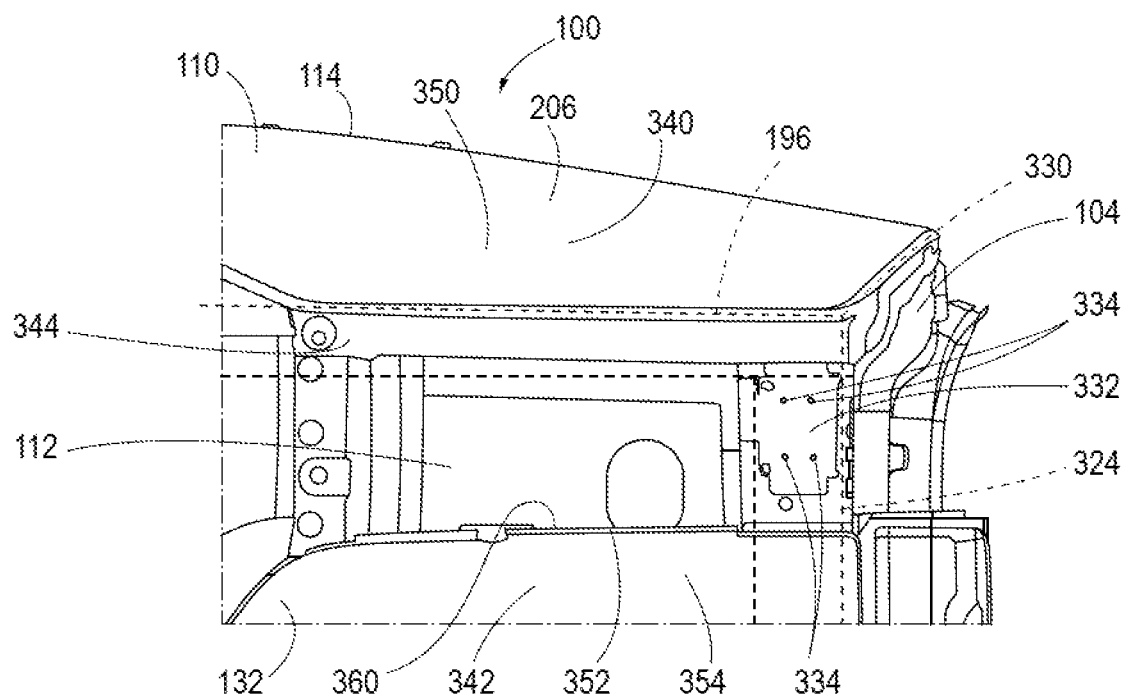
FIG. 14 is a partial side view of the vehicle including a second longitudinal end of the vehicle.

As shown in FIG. 14, the frame 196 includes a third support beam 324 extending in a height direction of the vehicle 100. The first support beam 200 and the third support beam 324 are connected to each other so as to form a second corner 330 of the frame 196 at the roof 206 of the vehicle 100 in the second longitudinal end portion 104.

A vertical support mount 332 is fixed to the third support beam 324, and extends along the third support beam 324 in the height direction of the vehicle 100. The vertical support mount 232 defines a plurality of vertical support mount holes 334 which are aligned with the third support beam 324 in the lateral direction of the vehicle 100. The plurality of vertical support mount holes 334 are configured for receiving fasteners driven into the third support beam 324 for fixing the vertical support mount 332 to the third support beam 324 in the interior 112 of the vehicle 100.

A first exterior panel 340 and a second exterior panel 342 included in the exterior paneling 110 at the second longitudinal end 104 have main body portions defining the exterior 114 of the vehicle 100, and flanges that extend into the interior 112 of the vehicle 100, over the first support beam 200 and the third support beam 324 in the lateral direction of the vehicle 100. The first exterior panel 340 includes a sixth exterior panel flange 344 extended from a sixth exterior panel main body portion 350 and into the interior 112 of the vehicle 100, over the second support beam 202 and the third support beam 324 in the lateral direction of the vehicle 100. The sixth exterior panel main body portion 350 forms the exterior 114 of the vehicle 100 along the roof 206, extending from the second corner 330 in the longitudinal direction of the vehicle 100.

The second exterior panel 342 is positioned on the vehicle 100 spaced below the sixth exterior panel 342 in the height direction of the vehicle 100. The second exterior panel 342 includes a seventh exterior panel flange 352 extended from a seventh exterior panel main body portion 354 and into the interior 112 of the vehicle 100. The seventh exterior panel main body portion 354 forms the exterior 114 of the vehicle 100 along the first lateral side 132 of the vehicle 100. The seventh exterior panel flange 352 and the seventh exterior panel main body portion 354 overlap the third support beam 324 in the lateral direction of the vehicle 100 and extend along the first lateral side 132 of the vehicle 100, from the third support beam 324 in the longitudinal direction of the vehicle 100.

The sixth exterior panel main body portion 350 and the seventh exterior panel main body portion 354 are spaced from each other in the height direction of the vehicle 100, and the sixth exterior panel flange 344 and the seventh exterior panel flange 352 extend into the interior 112 of the vehicle 100 to define a recess 360 extending from the exterior 114 to the interior 112 between the first exterior panel 340 and the second exterior panel 342. The recess 360 is configured for receiving the interior portion 280 of the first casting 272 in the second pair of module support systems 150.

Figure 15:
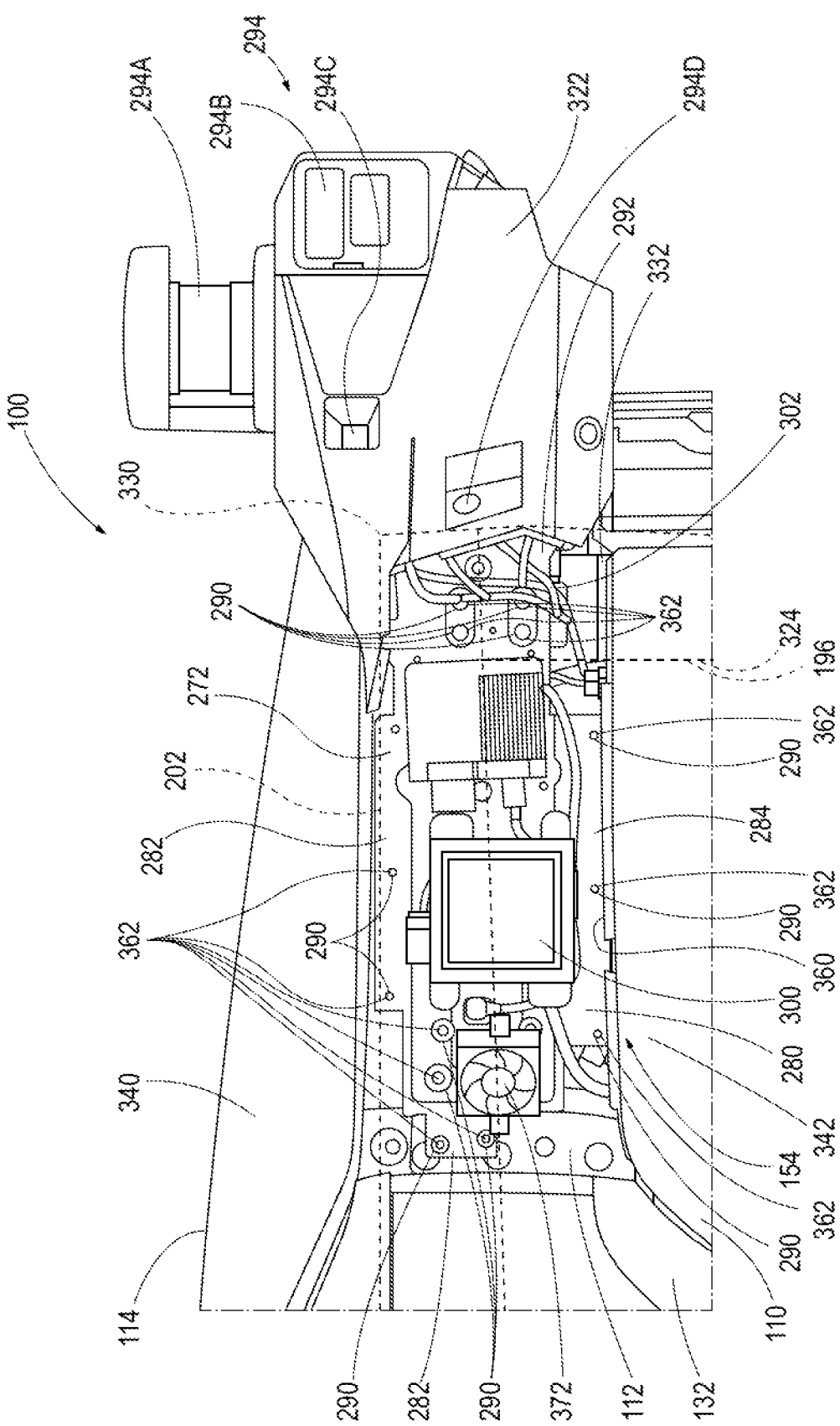
FIG. 15 is a partial side view of the vehicle with the first casting, the second casting, and the first sensor module of FIG. 10 mounted thereon.

As shown in FIG. 15, the plurality of first casting flanges 282 and the first casting main body portion 284 of the first casting 272 overlap the first exterior panel 340 and the second exterior panel 342 in the lateral direction of the vehicle 100. Fasteners 362 are disposed in the plurality of first casting holes 290, through the vertical support mount 332, and the first exterior panel 340. The fasteners 362 extend into the frame 196, fixing the first casting 272, the first electronic device 294, and the second electronic device 300 to the frame 196 through the vertical support mount 332 and the first exterior panel 340.

The interior portion 280 of the first casting 272 is mounted on the second support beam 202 and the third support beam 324 in the recess 360, in the interior 112 of the vehicle 100. The exterior portion 292 extends away from the interior portion 280, outward from the frame 196 in the interior 112 of the vehicle 100, and beyond the exterior 114 of the vehicle 100 in the lateral direction and the longitudinal direction of the vehicle 100. With this construction, the interior portion 280 is disposed in the recess 360, within the interior 112 of the vehicle 100 between the frame 196 and the exterior paneling 110, and supports the exterior portion 292 extending outward from the exterior 114 of the vehicle 100.

The first electronic device 294 is supported on the exterior portion 292 of the first casting 272 above the frame 196 in a height direction of the vehicle 100 where the interior portion 280 of the first casting 272 is mounted to the frame 196. The first electronic device 294 is also supported on the exterior portion 292 of the first casting 272 spaced away from the frame 196 in the longitudinal direction and the lateral direction of the vehicle 100 where the interior portion 280 of the first casting 272 is mounted to the frame 196. With this construction, the first electronic device 294 is arranged to collect information representing an external environment of the vehicle 100 above and around the frame 196 at the second corner 330 on the second lateral side 142 of the vehicle 100.

The first electronic device 294 is wired to the circuit 302, and the circuit 302 extends along the first casting 272 to the interior portion 280 of the first casting 272, into the interior 112 of the vehicle 100. The circuit 302 connects the first electronic device 294 and the second electronic device 300 to the data system and the electrical system provided in the vehicle 100 for receiving power and communicating with the computer provided in the vehicle 100.

Figure 16:
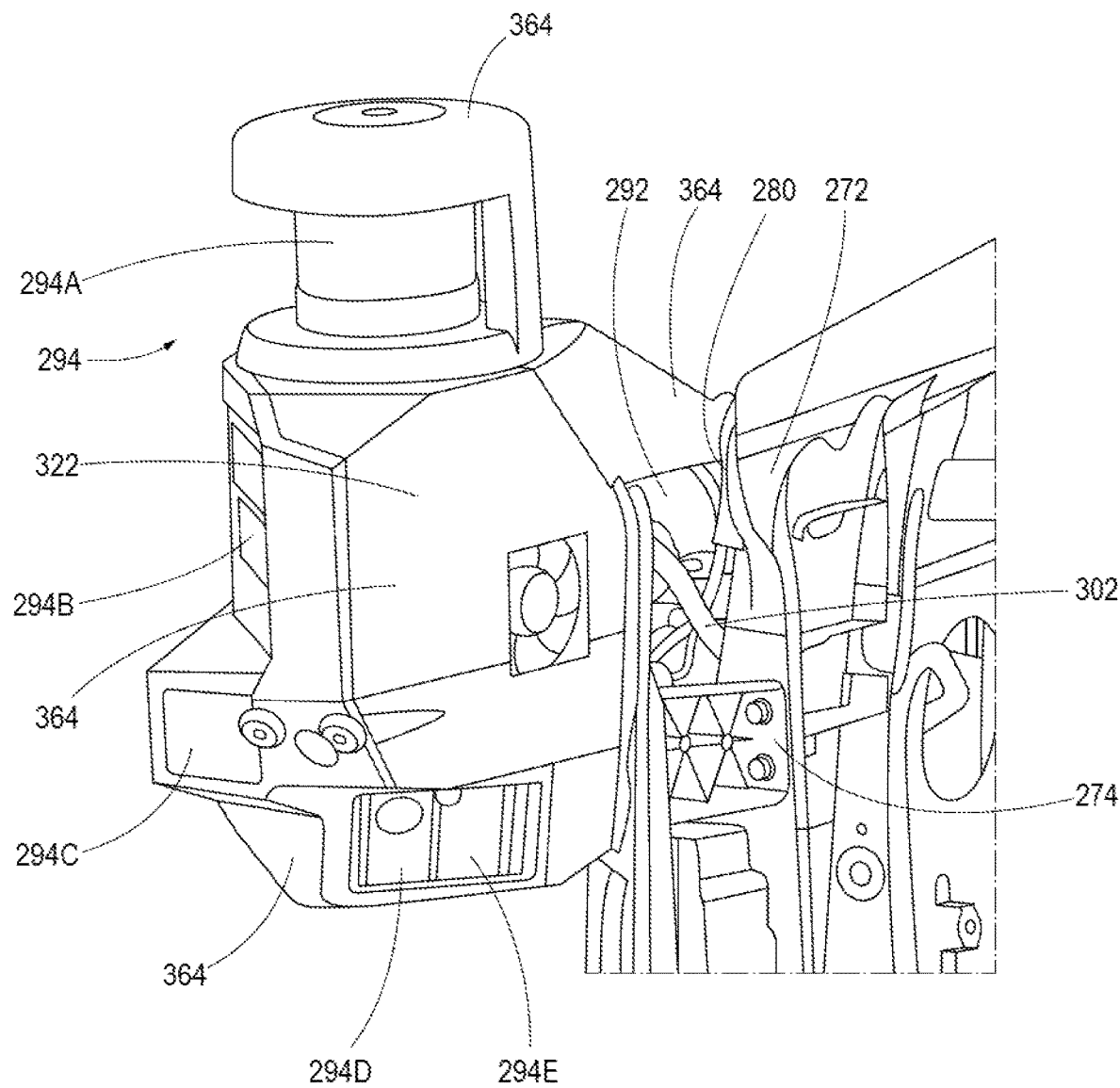
FIG. 16 is a partial perspective view of the vehicle with the first casting, the second casting, the first sensor module, and the cover of FIG. 13 mounted thereon.

As shown in FIG. 16, the cover 322 is fixed with the exterior portion 292 of the first casting 272 such that the cover 322 is disposed over the first electronic device 294 and the exterior portion 292 of the first casting 272 with respect to an external environment of the vehicle 100. In this manner, the cover 322 is configured to obstruct water, snow, and debris from reaching the exterior portion 292 and the first electronic device 294 from an external environment of the vehicle 100.

The cover 322 is formed from a plurality of cover panels 364 fixed with each other and the exterior portion 292 of the first casting 272. While, as depicted, the cover 322 includes four cover panels 364, the cover 322 may include more or fewer panels disposed over the first electronic device 294 and the exterior portion 292 of the first casting 272 without departing from the scope of the present disclosure.

Figure 17:
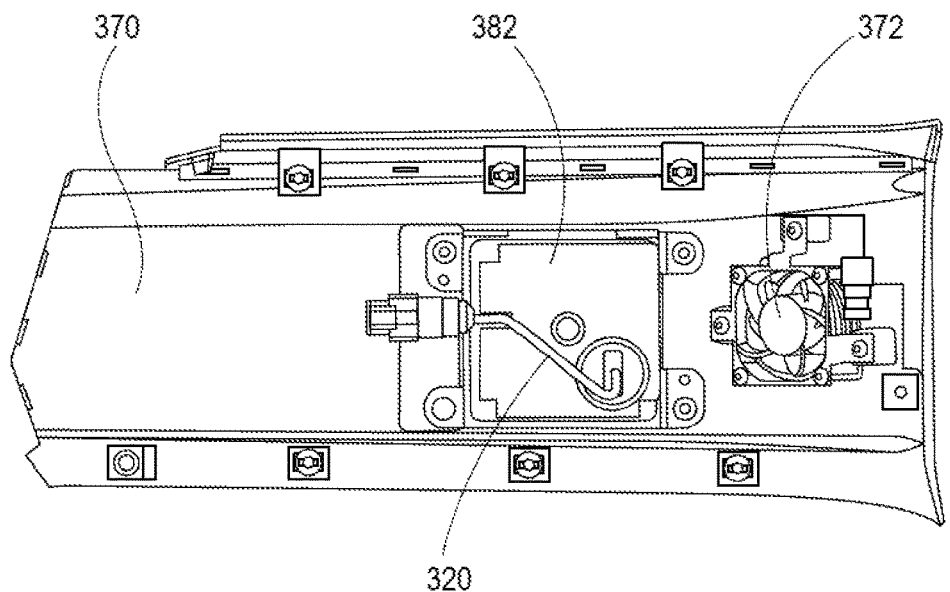
FIG. 17 is a front view of an exterior panel configured for being mounted on the vehicle, over the first casting, the second casting, and the first sensor module of FIG. 10.

As shown in FIG. 17, a third exterior panel 370 is shaped for being received in the recess 360, in the interior 112 of the vehicle 100 over the interior portion 280 of the first casting 272. A fan 372 is mounted on the third exterior panel 370 and configured to draw ambient air through the third exterior panel 370 from an interior side 374 of the third exterior panel 370 to an exterior side 380 of the third exterior panel 370 depicted in FIG. 18.

With continued reference to FIG. 17, a third electronic device 382 is mounted on the interior side 374 of the eighth exterior panel 380. The third electronic device 382 includes a sensor configured for collecting information representing an external environment of the vehicle 100, and wired to the circuit 302 for receiving power from and transmitting information to the vehicle 100. The third electronic device 382 includes similar features and functions in a similar manner as the first electronic device 294 and the second electronic device 300.

Figure 18:
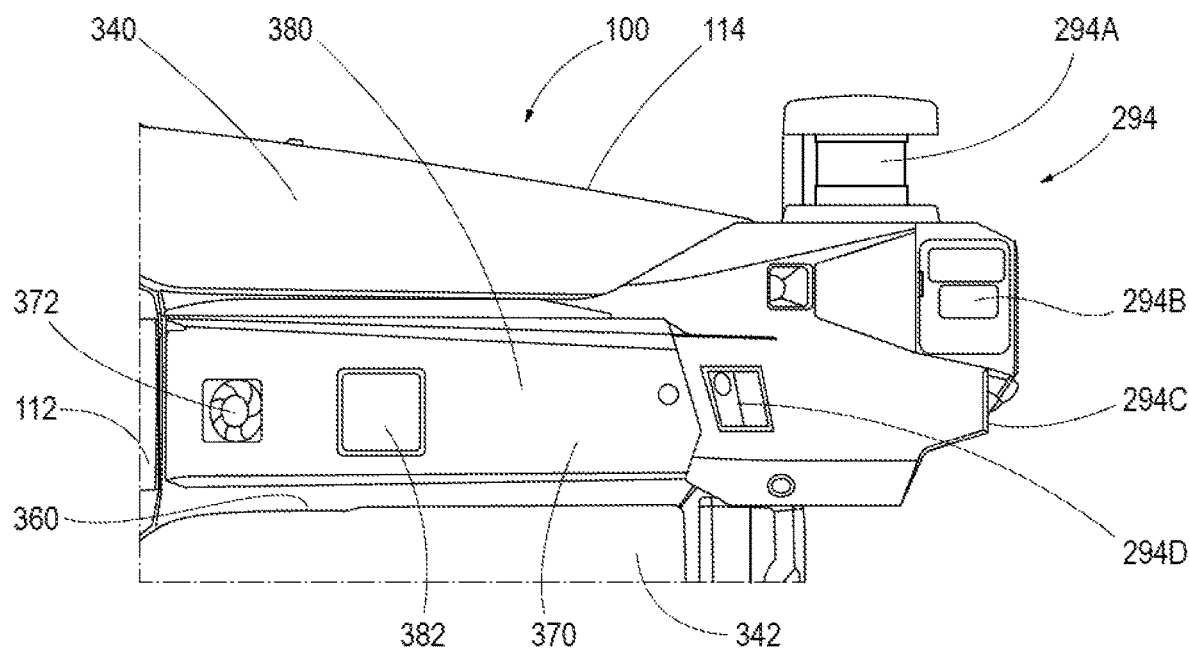
FIG. 18 is a partial side view of the vehicle with the first casting and the first sensor module of FIG. 3, and the exterior panel of FIG. 7 mounted thereon.

As shown in FIG. 18, the third exterior panel 370 is mounted in the recess 360, on the interior 112 of the vehicle 100 such that the exterior side 380 forms the exterior 114 of the vehicle 100 between the first exterior panel 340 and the second exterior panel 342 in the height direction of the vehicle 100. The third exterior panel 370 covers the interior portion 280, the second electronic device 300, the third electronic device 382, and the circuit 302 from an external environment of the vehicle 100.

The fan 372 is positioned in the interior 112 of the vehicle 100 such that the fan 372 is configured for directing ambient air from an external environment of the vehicle 100 to the interior 112 of the vehicle 100, into the recess 360 toward the second electronic device 300 and the third electronic device 382. In this manner, the fan 372 is configured for cooling the second electronic device 300 and the third electronic device 382 with ambient air from an external environment of the vehicle 100.

Figure 19:
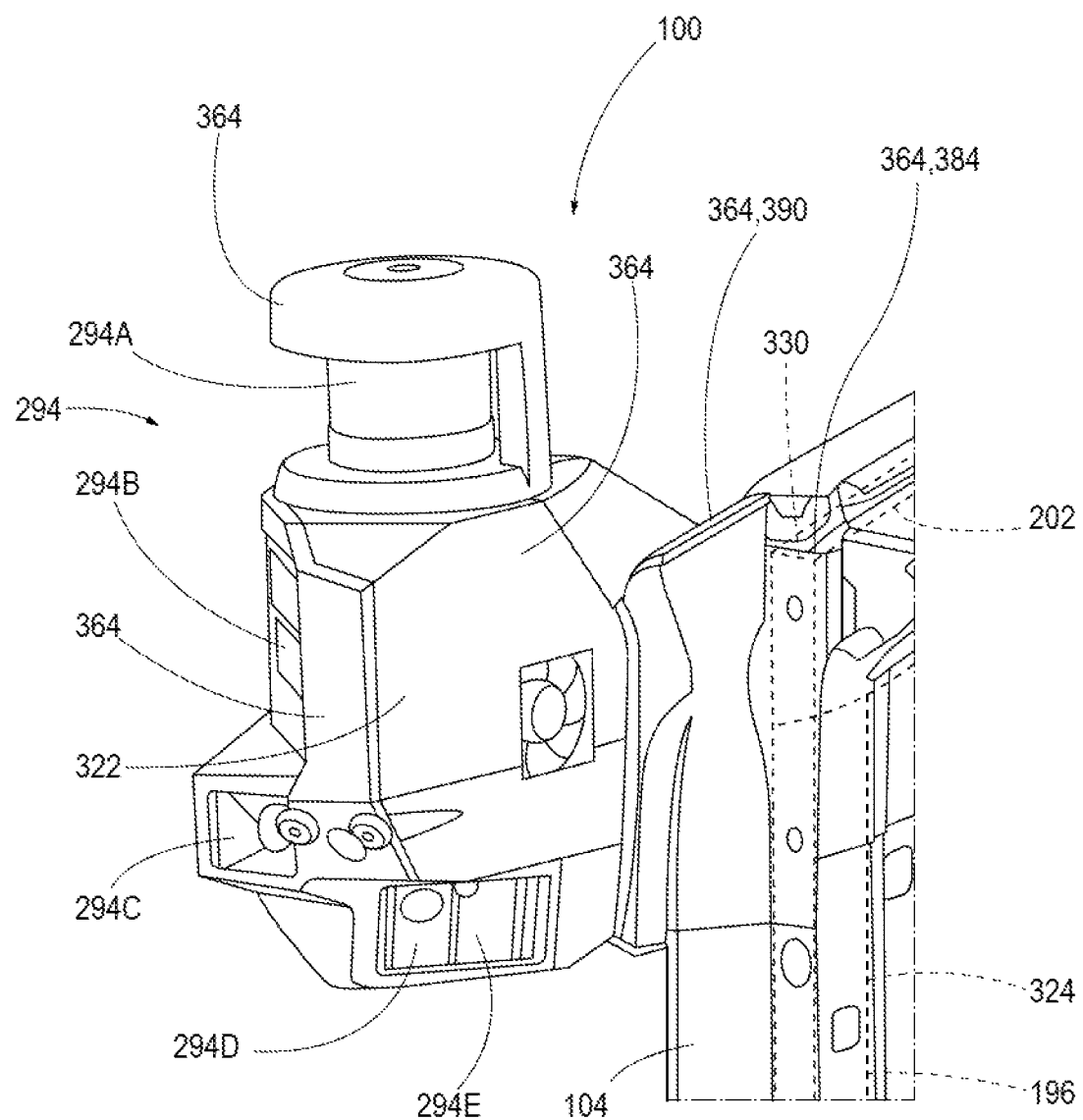
FIG. 19 is another partial perspective view of the vehicle with the first casting, the second casting, the first sensor module, and the cover of FIG. 13 mounted thereon.

As shown in FIG. 19, the cover 322 is arranged on the frame 196 such that the cover 322 extends over the second corner 330 formed in the second longitudinal end 104 of the vehicle 100 with respect to the height direction of the vehicle 100, and extends around the second lateral side 142 of the vehicle 100 in the lateral direction of the vehicle 100. More specifically, the cover 322 includes a first cover panel 384 in the plurality of cover panels 364 mounted on the second corner 330 and extending downward, from the second corner 330, along the third support beam 324 in the height direction of the vehicle 100. The first cover panel 384 is positioned on the frame 196 such that the first cover panel 384 overlaps the second support beam 202 and the third support beam 324 in the longitudinal direction of the vehicle 100.

The cover 322 also includes a second cover panel 390 in the plurality of cover panels 364 mounted on the second corner 330 and extending downward, from the second corner 330, along the third support beam 324 in the height direction of the vehicle 100. The second cover panel 390 is positioned on the frame 196 such that the first cover panel 384 overlaps the second support beam 202 and the third support beam 324 in the lateral direction of the vehicle 100. The first cover panel 384 and the second cover panel 390 are fixed to each other, the frame 196, and the remaining panels in the plurality of cover panels 364.

With reference to FIGS. 6 and 15, a method of assembling each of the first module support system 130 in the first pair of module support systems 122 and the first module support system 154 in the second pair of module support systems 150 includes mounting the first casting 164, 272 to the frame 196, where the first casting 164, 272 extends outward from the frame 196, through the exterior paneling 110, to the exterior of the vehicle 100 such that the first casting 164, 272 includes the interior portion 170, 280 disposed within the interior 112 of the vehicle 100 and mounted on the frame 196, and the exterior portion 180, 292 extending outward from the exterior 114 of the vehicle 100. The method also includes providing the first electronic device 182, 294 supported on the exterior portion 180, 292 of the first casting 164, 272. The method also includes fixing the cover 192, 322 with the exterior portion 180, 292 of the first casting 164, 272 such that the cover 192, 322 is disposed over the exterior portion 180, 292 and the first electronic device 182, 294 with respect to an external environment of the vehicle 100.

As shown in FIG. 12, the method of assembling the first module support system 154 in the second pair of module support systems 150 includes fastening the first casting 272 with the second casting 274, and mounting the second casting 274 on the frame 196 such that the second casting 274 supports the first casting 272 and the first electronic device 294 with respect to the frame 196. In an embodiment of the method, the first casting 272 is fastened with the second casting 274 before the first casting 272 is mounted on the frame 196, and the first casting 272 is mounted on the frame 196 with the second casting 274.

As shown in FIGS. 6 and 15, in an embodiment, the method of assembling each of the first module support system 130 in the first pair of module support systems 122 and the first module support system 154 in the second pair of module support systems 150 includes mounting the first casting 164, 272 along the first lateral side 132 of the vehicle 100 to extend in a longitudinal direction of the vehicle 100, wherein the exterior portion 180, 292 of the first casting 164, 272 extends beyond the frame 196 in the longitudinal direction of the vehicle 100. As shown in FIG. 12, the method of assembling the first module support system 154 in the second pair of module support systems 150 includes fastening the second casting 274 to the first casting 272 and the vehicle 100 such that the second casting 274 extends from the first casting 272 in the lateral direction of the vehicle 100, overlapping the frame 196 in the longitudinal direction of the vehicle 100 from a position outside the frame 196 in the longitudinal direction of the vehicle 100.

As shown in FIGS. 6 and 15, in an embodiment, the method of assembling each of the first module support system 130 in the first pair of module support systems 122 and the first module support system 154 in the second pair of module support systems 150 includes mounting the first casting 164, 272 to the frame 196 includes fastening the first casting 164, 272 to the frame 196 in the lateral direction of the vehicle 100. With reference to FIG. 12, the method of assembling the first module support system 154 in the second pair of module support systems 150 includes mounting the second casting 274 to the frame 196 includes fastening the second casting 274 to the frame 196 in the longitudinal direction of the vehicle 100.

As shown in FIGS. 6 and 15, in an embodiment, the method of assembling each of the first module support system 130 in the first pair of module support systems 122 and the first module support system 154 in the second pair of module support systems 150 includes mounting the interior portion 170, 280 of the first casting 164, 272 respectively on the first support beam 200 and the third support beam 324, and mounting the interior portion 170, 280 of the first casting 164, 272 on the second support beam 202. With reference to FIG. 6, the method of assembling the first module support system 130 in the first pair of module support systems 122 includes mounting the first casting 164 on the junction 210 between the first support beam 200 and the second support beam 202.

As shown in FIGS. 6-8 and 15-18, in an embodiment, the method of assembling each of the first module support system 130 in the first pair of module support systems 122 and the first module support system 154 in the second pair of module support systems 150 includes mounting the second electronic device 184, 300 on the interior portion 170, 280 of the first casting 164, 272, respectively disposing the fifth exterior panel 254 and the third exterior panel 370 over the second electronic device 184, 300 and the internal portion 170, 280 of the first casting 164, 272 with respect to the exterior 114 of the vehicle 100. The method also includes respectively mounting the fan 260, 372 on the fifth exterior panel 254 and the third exterior panel 370 such that the fan 260, 372 is respectively configured to direct ambient air from an external environment of the vehicle 100 over the first electronic device 182, 294 and the second electronic device 184, 300 between the fifth exterior panel 254 and the third exterior panel 370 and the interior portion 170, 280 of the first casting 164, 272.

With reference to FIGS. 6 and 15, the method also includes wiring the first electronic device 182, 294 in the circuit 190, 302, where the circuit 190, 302 extends along the first casting 164, 272 to the interior portion 170, 280 of the first casting 164, 272 in the interior 112 of the vehicle 100. The method also includes mounting the first electronic device 182, 294 on the cover 192, 322 such that the cover 192, 322 supports the first electronic device 182, 294 on the exterior portion 180, 292 of the first casting 164, 272, above the frame 196 and the exterior portion 180, 292 of the first casting 164, 272 in a height direction of the vehicle 100 where the interior portion 170, 280 of the first casting 164, 272 is mounted to the frame 196.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A module support system for a vehicle including exterior paneling defining an interior and exterior of the vehicle, and a frame disposed in the interior of the vehicle, the module support system comprising:
   a first casting mounted on the frame, wherein the first casting extends outward from the frame, through the exterior paneling, to the exterior of the vehicle such that the first casting includes an interior portion disposed within the interior of the vehicle and mounted on the frame, and an exterior portion extending outward from the exterior of the vehicle;
   a first electronic device supported on the exterior portion of the first casting; and
   a cover fixed with the exterior portion of the first casting such that the cover is disposed over the first electronic device and the exterior portion of the first casting with respect to an external environment of the vehicle.

2. The module support system of claim 1, further comprising a second casting mounted to the frame and fastened with the first casting, supporting the first casting and the first electronic device with respect to the frame.

3. The module support system of claim 2, wherein the first casting is arranged along a lateral side of the vehicle and extend in a longitudinal direction of the vehicle, the exterior portion of the first casting extends beyond the frame in the longitudinal direction of the vehicle, and the second casting extends from the first casting in a lateral direction of the vehicle, overlapping the frame in the longitudinal direction of the vehicle.

4. The module support system of claim 2, wherein the first casting is fastened to the frame in a lateral direction of the vehicle, and the second casting is fastened to the frame in the longitudinal direction of the vehicle.

5. The module support system of claim 1, wherein the interior portion of the first casting is mounted on a first support beam and a second support beam included in the frame, wherein the first support beam extends in a height direction of the vehicle and the second support beam extends in a longitudinal direction of the vehicle.

6. The module support system of claim 1, wherein the interior portion of the first casting is mounted on a junction between a first support beam and a second support beam included in the frame, wherein the first support beam extends in a height direction of the vehicle, the second support beam extends in a longitudinal direction of the vehicle, and the junction is a plate fixed with each of the first support beam and the second support beam.

7. The module support system of claim 1, further comprising a second electronic device mounted on the interior portion of the first casting, a panel disposed over the interior portion of the first casting, and a fan mounted on the panel, wherein the fan is configured for directing air toward the second electronic device.

8. The module support system of claim 1, wherein the first electronic device is mounted on the cover such that the cover supports the first electronic device on the exterior portion of the first casting,
   wherein the first electronic device includes a sensor configured for collecting information representing an external environment of the vehicle, and the sensor is supported on the exterior portion of the first casting above the frame in a height direction of the vehicle where the interior portion of the first casting is mounted to the frame.

9. The module support system of claim 1, wherein the first casting is a single unitary piece, the interior portion being integrally formed with the exterior portion.

10. A method of assembling a module support system for a vehicle including exterior paneling defining an interior and exterior of the vehicle, and a frame disposed in the interior of the vehicle, the method comprising:
   mounting a first casting on the frame, wherein the first casting extends outward from the frame, through the exterior paneling, to the exterior of the vehicle such that the first casting includes an interior portion disposed within the interior of the vehicle and mounted on the frame, and an exterior portion extending outward from the exterior of the vehicle;
   providing a first electronic device supported on the exterior portion of the first casting; and
   fixing a cover with the exterior portion of the first casting such that the cover is disposed over the exterior portion and the first electronic device with respect to an external environment of the vehicle.

11. The method of claim 10, further comprising fastening the first casting with a second casting, and mounting the second casting on the frame such that the second casting supports the first casting and the first electronic device with respect to the frame.

12. The method of claim 11, wherein the first casting is fastened with the second casting before the first casting is mounted on the frame, and the first casting is mounted on the frame with the second casting.

13. The method of claim 11, wherein the step of mounting the first casting on the frame includes mounting the first casting along a lateral side of the vehicle to extend in a longitudinal direction of the vehicle, wherein the exterior portion of the first casting extends beyond the frame in the longitudinal direction of the vehicle, and the second casting extends from the first casting in a lateral direction of the vehicle, overlapping the frame in the longitudinal direction of the vehicle from a position outside the frame in the longitudinal direction of the vehicle,
   the step of mounting the first casting to the frame includes fastening the first casting to the frame in the lateral direction of the vehicle, and
   the step of mounting the second casting to the frame includes fastening the second casting to the frame in the longitudinal direction of the vehicle.

14. The method of claim 10, wherein the step of mounting the first casting on the frame includes mounting the interior portion of the first casting on a first support beam and a second support beam included in the frame, wherein the first support beam extends in a height direction of the vehicle and the second support beam extends in a longitudinal direction of the vehicle.

15. The method of claim 10, wherein the step of mounting the first casting on the frame includes mounting the first casting on a junction between a first support beam and a second support beam included in the frame, wherein the first support beam extends in a height direction of the vehicle, and the second support beam extends in a longitudinal direction of the vehicle.

16. The method of claim 10, further comprising mounting a second electronic device on the interior portion of the first casting, disposing a panel over the second electronic device and the internal portion of the first casting with respect to the exterior of the vehicle, and mounting a fan on the panel such that the fan is configured to direct ambient air from the external environment over the first electronic device and the second electronic device between the panel and the interior portion of the first casting.

17. The method of claim 10, further comprising mounting the first electronic device on the cover such that the cover supports the first electronic device on the exterior portion of the first casting, above the frame and the exterior portion of the first casting in a height direction of the vehicle where the interior portion of the first casting is mounted to the frame.

18. A module support system for a vehicle including exterior paneling defining an interior and exterior of the vehicle, and a frame disposed in the interior of the vehicle, the module support system comprising:
   a first casting mounted on the frame, wherein the first casting extends outward from the frame, through the exterior paneling, to the exterior of the vehicle such that the first casting includes an interior portion disposed within the interior of the vehicle and mounted on the frame, and an exterior portion extending outward from the exterior of the vehicle;
   a second casting mounted to the frame and fastened with the first casting, supporting the exterior portion of the first casting with respect to the frame;
   a first electronic device supported on the exterior portion of the first casting; and
   a cover fixed with the exterior portion of the first casting such that the cover is disposed over the first electronic device and the exterior portion of the first casting with respect to an external environment of the vehicle.

19. The module support system of claim 18, wherein the first casting is arranged along a lateral side of the vehicle and extends in a longitudinal direction of the vehicle, the exterior portion of the first casting extends beyond the frame in the longitudinal direction of the vehicle, and the second casting extends from the first casting in a lateral direction of the vehicle, overlapping the frame in the longitudinal direction of the vehicle.

20. The module support system of claim 18, wherein the first casting is fastened to the frame in a lateral direction of the vehicle, and the second casting is fastened to the frame in the longitudinal direction of the vehicle.

* * * * *